(12) United States Patent
Abe et al.

(10) Patent No.: US 11,416,409 B2
(45) Date of Patent: Aug. 16, 2022

(54) COMPUTER SYSTEM AND MEMORY MANAGEMENT METHOD

(71) Applicant: Hitachi, Ltd., Tokyo (JP)

(72) Inventors: Takahiro Abe, Tokyo (JP); Takashi Noda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/029,329

(22) Filed: Sep. 23, 2020

(65) Prior Publication Data

US 2021/0255959 A1 Aug. 19, 2021

(30) Foreign Application Priority Data

Feb. 14, 2020 (JP) .............................. JP2020-023760

(51) Int. Cl.
| | |
|---|---|
| *G06F 12/00* | (2006.01) |
| *G06F 13/00* | (2006.01) |
| *G06F 13/28* | (2006.01) |
| *G06F 12/0873* | (2016.01) |
| *G06F 12/0871* | (2016.01) |
| *G06F 12/0882* | (2016.01) |
| *G06F 12/1081* | (2016.01) |
| *G06F 9/4401* | (2018.01) |
| *G06F 9/50* | (2006.01) |
| *G06F 12/14* | (2006.01) |

(52) U.S. Cl.
CPC ........ *G06F 12/0873* (2013.01); *G06F 9/4406* (2013.01); *G06F 9/5016* (2013.01); *G06F 12/0871* (2013.01); *G06F 12/0882* (2013.01); *G06F 12/1081* (2013.01); *G06F 12/1425* (2013.01); *G06F 2212/657* (2013.01); *G06F 2212/7201* (2013.01)

(58) Field of Classification Search
CPC ............... G06F 12/0873; G06F 9/5077; G06F 12/0871; G06F 12/1081
USPC ........................................................ 711/154
See application file for complete search history.

(56) References Cited

U.S. PATENT DOCUMENTS

| | | | |
|---|---|---|---|
| 2005/0165837 A1* | 7/2005 | Dmitrovich | ......... G06F 12/0866 |
| 2010/0220359 A1* | 9/2010 | Ohgishi | ................ G06F 9/5077 358/1.16 |

(Continued)

FOREIGN PATENT DOCUMENTS

WO 2017/056310 A1 4/2017

*Primary Examiner* — Edward J Dudek, Jr.
*Assistant Examiner* — Sidney Li
(74) *Attorney, Agent, or Firm* — Mattingly & Malur, PC

(57) ABSTRACT

A memory management method of a computer including a memory and a processor connected to the memory, the method includes, by the processor, executing an OS and executing a plurality of processes on the OS. The plurality of processes include a virtual storage device and an application. The processor provides the application with a physical area of the memory, which is managed by the OS, controls the virtual storage device to use a physical area of the memory, which is mounted on the computer, but is not managed by the OS, secures continuous physical areas from the physical area of the memory, which is managed by the OS, to be used by the virtual storage device, and performs DMA transfer between the virtual storage device and the application by using the secured continuous physical areas.

5 Claims, 14 Drawing Sheets

(56) References Cited

U.S. PATENT DOCUMENTS

| | | | |
|---|---|---|---|
| 2011/0138160 A1* | 6/2011 | Sato | G06F 3/061 |
| | | | 713/2 |
| 2018/0081816 A1* | 3/2018 | Coburn | G06F 12/0868 |
| 2018/0203733 A1 | 7/2018 | Tajima et al. | |

* cited by examiner

FIG. 4

STORAGE PROGRAM MEMORY MAPPING TABLE T40

| AREA ID | PURPOSE | SHARED RANGE | (CONTINUOUS) REQUIRED SIZE | VIRTUAL LEADING ADDRESS | OS-MANAGED AREA | ALLOCATION FLAG |
|---|---|---|---|---|---|---|
| 1 | LM | STORAGE PROCESS 1 | 0x1000 | 0x0000_0010_0000 | TRUE | TRUE |
| 2 | LM | STORAGE PROCESS 2 | 0x4_0000 | 0x0000_0020_0000 | FALSE | TRUE |
| 3 | LM | STORAGE PROCESS 3 | 0x1001 | 0x0000_0030_0000 | TRUE | TRUE |
| 4 | LM | STORAGE PROCESS 4 | 0x3_ffff | 0x0000_0040_0000 | FALSE | TRUE |
| 5 | PM | STORAGE PROCESS 1, 2 | 0x2000_0000 | 0x0001_0000_0000 | TRUE | TRUE |
| 6 | PM | STORAGE PROCESS 3, 4 | 0x2000_0000 | 0x0002_0000_0000 | TRUE | TRUE |
| 7 | SM | STORAGE PROCESS 1, 2, 3, 4 | 0x1000_0000 | 0x0003_0000_0000 | FALSE | TRUE |
| 8 | SM | STORAGE PROCESS 1, 2, 3, 4 | 0x4000_0000 | 0x0004_0000_0000 | TRUE | TRUE |
| 9 | CM | STORAGE PROCESS 1, 2, 3, 4 | 0x4000_0000 | 0x0005_0000_0000 | FALSE | TRUE |
| 10 | CM | STORAGE PROCESS 1, 2, 3, 4 | 0x1000_0000 | 0x0006_0000_0000 | TRUE | TRUE |
| 11 | DXBF | STORAGE PROCESS 3, 4 | 0x3000_0000 | 0x0007_0000_0000 | TRUE | TRUE |
| 12 | DXBF | STORAGE PROCESS 1, 2 | 0x2000_0000 | 0x0008_0000_0000 | FALSE | TRUE |

IN-DRAM huge-page-NUMBER
MANAGEMENT TABLE  T50

| SIZE (501) | RESERVATION NUMBER (502) | ALLOCATED (503) |
|---|---|---|
| 1GB | 10 | 5 |
| 2MB | 15 | 1 |
| 4k | 10 | 1 |

FIG. 6

DRAM OS-UNMANAGED
MANAGEMENT TABLE  T51

| IN-MANAGEMENT offset ADDRESS | 0xA_8000_0000 |
|---|---|
| NON-MANAGEMENT max ADDRESS | 0xF_FFFF_FFFF |
| ALLOCATION offset ADDRESS | 0xA_F004_3FFF |

FIG. 7

IN-SYSTEM MEMORY AMOUNT
MANAGEMENT TABLE   T70

| TOTAL SYSTEM DRAM CAPACITY | 64G |
|---|---|
| STORAGE-PROCESS-UNIT CONTROL INFORMATION MATERIAL AMOUNT (LM) | 500M |
| STORAGE-SYSTEM-UNIT CONTROL INFORMATION MATERIAL AMOUNT (SM) | 5G |
| STORAGE-SYSTEM TRANSFER BUFFER MEMORY USAGE AMOUNT (DXBF) | 5G |
| STORAGE-CACHE-AMOUNT MEMORY USAGE AMOUNT (CM) | 10G |

FIG. 10

STORAGE PROGRAM MEMORY MAPPING TABLE  T100

| AREA ID | PURPOSE | SHARED RANGE | (CONTINUOUS) REQUIRED SIZE | VIRTUAL LEADING ADDRESS | POWER-OFF TARGET FLAG | OS-MANAGED AREA | ALLOCATION FLAG | PLACEMENT DESTINATION MEMORY TYPE |
|---|---|---|---|---|---|---|---|---|
| 1 | LM | STORAGE PROCESS 1 | 0x1000 | 0x0000_0010_0000 | FALSE | TRUE | TRUE | DRAM |
| 2 | LM | STORAGE PROCESS 2 | 0x4_0000 | 0x0000_0020_0000 | FALSE | FALSE | TRUE | DRAM |
| 3 | LM | STORAGE PROCESS 3 | 0x1001 | 0x0000_0030_0000 | FALSE | TRUE | TRUE | DRAM |
| 4 | LM | STORAGE PROCESS 4 | 0x3_ffff | 0x0000_0040_0000 | FALSE | FALSE | TRUE | DRAM |
| 5 | PM | STORAGE PROCESS 1, 2 | 0x2000_0000 | 0x0001_0000_0000 | FALSE | TRUE | TRUE | DRAM |
| 6 | PM | STORAGE PROCESS 3, 4 | 0x2000_0000 | 0x0002_0000_0000 | FALSE | TRUE | TRUE | DRAM |
| 7 | SM | STORAGE PROCESS 1, 2, 3, 4 | 0x1000_0000 | 0x0003_0000_0000 | FALSE | FALSE | TRUE | SCM |
| 8 | SM | STORAGE PROCESS 1, 2, 3, 4 | 0x4000_0000 | 0x0004_0000_0000 | TRUE | TRUE | TRUE | DRAM |
| 9 | CM | STORAGE PROCESS 1, 2, 3, 4 | 0x4000_0000 | 0x0005_0000_0000 | TRUE | FALSE | TRUE | DRAM |
| 10 | CM | STORAGE PROCESS 1, 2, 3, 4 | 0x1000_0000 | 0x0006_0000_0000 | FALSE | TRUE | TRUE | SCM |
| 11 | DXBF | STORAGE PROCESS 3, 4 | 0x3000_0000 | 0x0007_0000_0000 | FALSE | TRUE | TRUE | DRAM |
| 12 | DXBF | STORAGE PROCESS 1, 2 | 0x2000_0000 | 0x0008_0000_0000 | FALSE | FALSE | TRUE | DRAM |

FIG. 11

IN-SCM huge-page-NUMBER MANAGEMENT TABLE T110

| SIZE | RESERVATION NUMBER | ALLOCATED |
|---|---|---|
| 1GB | 10 | 1 |
| 2MB | 15 | 0 |
| 4k | 10 | 0 |

FIG. 12

SCM OS-UNMANAGED MANAGEMENT TABLE T120

| IN-MANAGEMENT offset ADDRESS | 0xB_8000_0000 |
|---|---|
| NON-MANAGEMENT max ADDRESS | 0xF_FFFF_FFFF |
| ALLOCATION offset ADDRESS | 0xB_9000_0000 |

FIG. 13

PROTECTION TARGET MANAGEMENT TABLE  T130

| AREA ID | LEADING PHYSICAL ADDRESS ON DRAM | SIZE | RESTORATION MANAGEMENT FLAG |
|---|---|---|---|
| 8 | 0x3_AAAA_0000 | 0x4000_0000 | TRUE |
| 9 | 0xA_C004_3FFF | 0x4000_0000 | TRUE |

IN-SYSTEM MEMORY AMOUNT MANAGEMENT TABLE  T140

| TOTAL SYSTEM DRAM CAPACITY | 64G |
|---|---|
| TOTAL SYSTEM SCM CAPACITY | 64G |
| STORAGE-PROCESS-UNIT CONTROL INFORMATION MATERIAL AMOUNT (LM) | 500M |
| STORAGE-SYSTEM-UNIT CONTROL INFORMATION MATERIAL AMOUNT (SM) | 5G |
| STORAGE-SYSTEM TRANSFER BUFFER MEMORY USAGE AMOUNT (DXBF) | 5G |
| STORAGE-CACHE-AMOUNT MEMORY USAGE AMOUNT (CM) | 10G |

COMPUTER SYSTEM AND MEMORY MANAGEMENT METHOD

CROSS-REFERENCE TO RELATED APPLICATION

The present application claims priority from Japanese application JP 2020-023760, filed on Feb. 14, 2020, the contents of which is hereby incorporated by reference into this application.

BACKGROUND OF THE INVENTION

1. Field of the Invention

The present invention relates generally to a storage system and a memory management method of the storage system.

2. Description of the Related Art

In a cloud environment, a performance management function of managing the performance of a plurality of tenants is known. In addition, a virtual storage used by a tenant is known. In a general-purpose operating system (OS) such as Linux (registered trademark), a container technology is known as a technology of controlling resources allocated to processes running on the OS.

It is possible to guarantee the performance of data transfer by allocating physically-continuous memory areas to the virtual storage.

However, when the virtual storage is executed as a process on the general-purpose OS, the memory allocated to the process by the OS is a virtual memory, and thus it is not guaranteed that physical memory areas corresponding to virtual memory areas are continuous.

Therefore, even with a resource allocation control technology provided by the OS, it is not possible to control allocation of physically-continuous memory areas, and it is not possible to guarantee the performance of the virtual storage.

WO 2017/056310 A discloses a technology of guaranteeing the performance of a virtual storage device by allocating physically-continuous memory areas to the virtual storage device executed on an OS.

According to WO 2017/056310 A, the physically-continuous memory areas in an OS-unmanaged physical resource which is mounted in a computer, but is not managed by the OS are allocated to the virtual storage device. An open source software (OSS) application that operates on Linux generally secures a memory to be used from a Linux-managed area. Therefore, for example, when data transfer is performed between the virtual storage device and the OSS application that operates on Linux, it is necessary to perform the data transfer between an area in a Linux-unmanaged physical resource and an area in a Linux-managed area. It is considered that such unnecessary data transfer causes performance degradation.

In particular, when a protocol chip of the front end or the back end of the virtual storage device uses OSS to perform data transfer, it is not possible to use the Linux-unmanaged area from the OSS. Thus, it is necessary to perform data transfer into the Linux-managed area.

SUMMARY OF THE INVENTION

An object of the present invention is to provide a computer system and a memory management method in which it is possible to improve the performance by suppressing an occurrence of unnecessary data transfer between OSS on a general-purpose OS and a virtual storage device.

To achieve the above object, according to an embodiment, a computer constituting a storage system includes a memory and a processor connected to the memory. The processor executes an OS and executes a plurality of processes on the OS. The plurality of processes include a virtual storage device and an application. The processor provides the application with a physical area of the memory, which is managed by the OS, controls the virtual storage device to use a physical area of the memory, which is mounted on the computer, but is not managed by the OS, and secures continuous physical areas from the physical area of the memory, which is managed by the OS, to be used by the virtual storage device.

According to the representative embodiment of the present invention, it is possible to improve the performance by suppressing the occurrence of unnecessary data transfer between the OSS on the general-purpose OS and the virtual storage device.

Objects, configurations, and effects other than those described above will be clarified by the following description of embodiments.

BRIEF DESCRIPTION OF THE DRAWINGS

FIG. 4 is a diagram showing an example of a storage program memory mapping table;

FIG. 5 is a diagram showing an example of an in-DRAM huge-page-number management table;

FIG. 6 is a diagram showing an example of a DRAM OS-unmanaged management table;

FIG. 7 is a diagram showing an example of an in-system memory amount management table;

FIG. 10 is a diagram showing an example of the storage program memory mapping table to which a data item to be used in power cut-off is added;

FIG. 11 is a diagram showing an example of an in-SCM huge-page-number management table;

FIG. 12 is a diagram showing an example of an SCM OS-unmanaged management table;

FIG. 13 is a diagram showing an example of a protection target management table;

FIG. 14 is a diagram showing an example of an in-system memory amount management table;

DETAILED DESCRIPTION OF THE PREFERRED EMBODIMENTS

Figure 1:
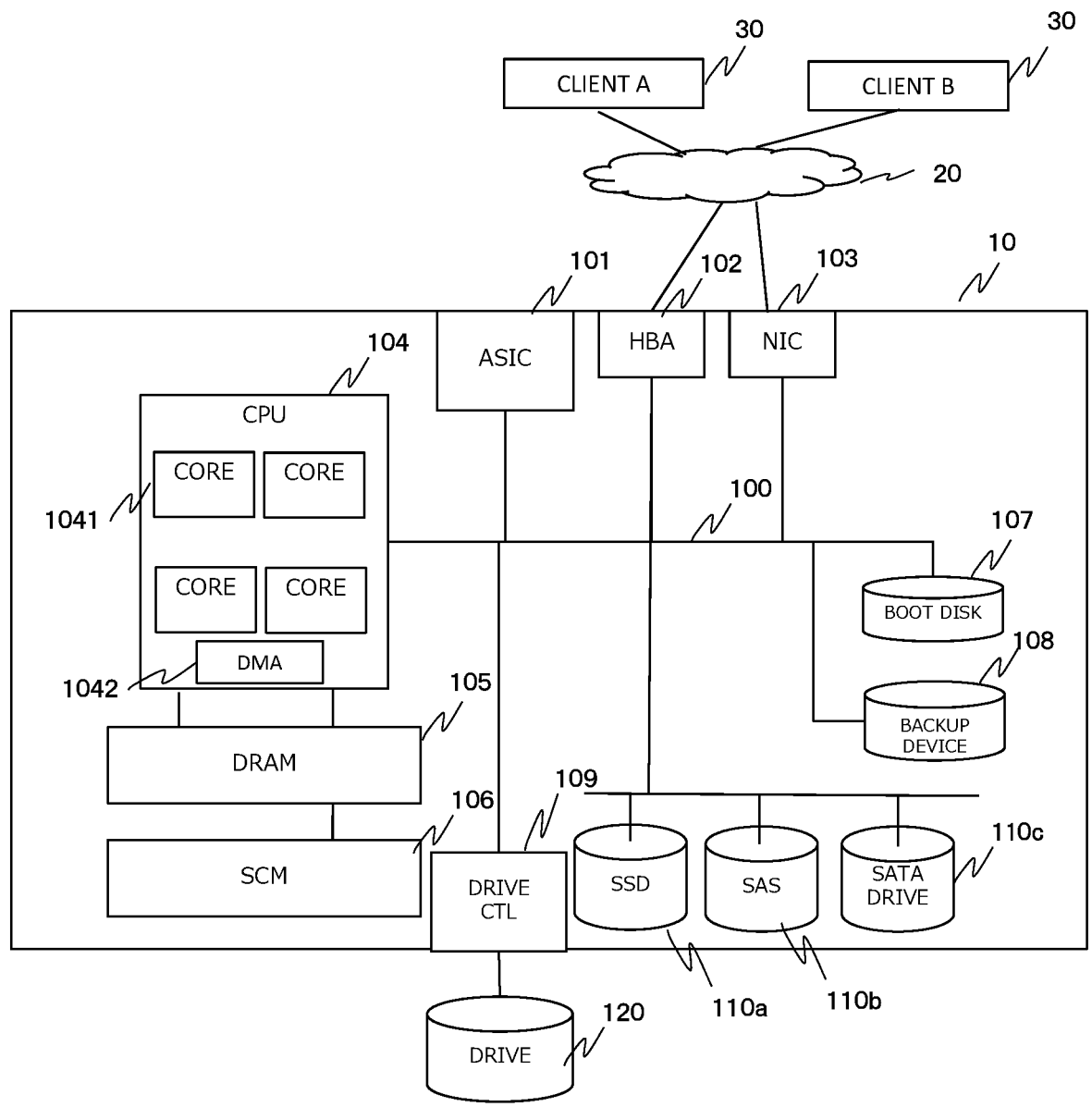
FIG. 1 is a block diagram illustrating a configuration example of a computer system according to a first embodiment.

Hereinafter, embodiments of the present invention will be described with reference to the drawings.

The following description and drawings are exemplifications for describing the present invention, and may be omitted and simplified as appropriate for clarifying the description. The present invention can be implemented in various other forms. Constituent elements may be singular or plural unless otherwise specified.

The embodiments described below do not limit the invention according to the claims, and all combinations of the elements described in the embodiments are not necessarily essential to the solution means of the invention.

In the following description, information may be described by an expression of "xxx table", but the information may be realized by any data structure. That is, "xxx table" may be referred to as "xxx information" to indicate that the information does not depend on the data structure. In the following description, the configuration of each table is an example. One table may be divided into two or more tables, or all or some of the two or more tables may be combined to one table. In the following description, when identification information is described, expressions such as "identification information", an "identifier", a "name", an "ID", and a "number" are used, and the expressions may be replaced with each other.

In the following description, an ID is used as identification information of an element, but other types of identification information may be used instead of or in addition to the ID.

In the following description, when description are made without distinguishing the same types of elements from each other, the reference sign or the common number in the reference sign is used. When the descriptions are made with distinguishing the same types of elements from each other, the reference sign of the element may be used, or a code assigned to the element instead of the reference sign may be used.

In the following description, an input/output (I/O) request is a write request or a read request and may be referred to as an access request.

In the following description, processing may be described with the term of a "program" as the subject. However, since the program is executed by a processor (for example, a central processing unit (CPU)) to perform predetermined processing appropriately using storage resources (for example, memory) and/or an interface device (for example, communication port), the subject of the processing may be set to a processor. The processing described with the program as the subject may be processing performed by a processor or an apparatus including the processor, or a system. The processor may include a hardware circuit that performs a portion or the entirety of the processing. The program may be installed from a program source on a device such as a computer. The program source may be, for example, a program distribution server or a computer readable storage medium. When the program source is the program distribution server, the program distribution server may include a processor (for example, a CPU) and storage resources, and the storage resource may further store a distribution program and a program to be distributed. Since the processor of the program distribution server executes the distribution program, the processor of the program distribution server may distribute the program to be distributed to another computer. In the following description, two or more programs may be realized as one program, or one program may be realized as two or more programs.

In the following description, the computer may include one or more computers.

First Embodiment

<System Configuration>

FIG. 1 is a block diagram illustrating a configuration example of a computer system according to a first embodiment.

The computer system includes one or more computers 10, a network 20, and one or more clients 30.

The computer 10 constituting a storage system includes a DRAM 105 as a physical memory, a central processing unit (CPU) 104, an ASIC 101, an HBA 102, and an NIC 103 which function as network IFs, a drive controller 109, and a drive 120 including, for example, a SAS drive.

The CPU 104 being the processor includes a core 1041 and a direct memory access (DMA) controller 1042. The DRAM 105, the CPU 104, the network IF, and the drive controller are connected to each other via a bus 100. Data DMA-transferred by the DMA controller 1042 may be write data received from the client 30 in response to a write request, may be read data read out from the drive 120 in response to a read request, or may be read data read out by cache hit at time of a read request. One of a transfer source and a transfer destination of DMA transfer by the DMA controller 1042 may be a memory in a physical device such as the network IF (HBA 102, NIC 103), the drive controller 109, and the drive 120. An FE chip is included in the HBA 102 and the NIC 103, and a BE chip is included in the drive controller 109.

A boot disk 107 and a backup device 108 are connected to the bus 100. An SSD 110*a*, a SAS 110*b*, and a SATA drive 110*c* may be connected as storage devices 110, to the bus 100.

An SCM 106 may be connected as a physical memory, in addition to the DRAM 105. In the first embodiment, descriptions will be made on the premise that the physical memory is configured by the DRAM.

The DRAM 105 stores a program or data. The network IF is connected to the network 20 and communicates with the client via the network 20. The drive controller 109 is an interface that is connected to the drive 120 and communicates with the drive 120. The drive 120 stores data. The core 1041 executes processing in accordance with a program stored in the DRAM 105. The DMA controller 1042 performs DMA transfer of data in accordance with an instruction of the core 1041. The DRAM 105 may include a plurality of physical memories.

The network 20 is, for example, a high-performance network such as Ethernet (registered trademark) or Infiniband (registered trademark), and is compatible with NVMe over Fabrics (NVMe-oF).

The client 30 is a computer device including a central processing unit (CPU) and a storage device such as a memory. The client transmits a write command or a read command (IO command) to the computer 10 via the network 20, in response to a user operation or a request from a built-in program.

For example, the drive 120 may have a redundant path and may be configured to enable data communication with the computer 10 even though one of the paths is disconnected.

Figure 2:
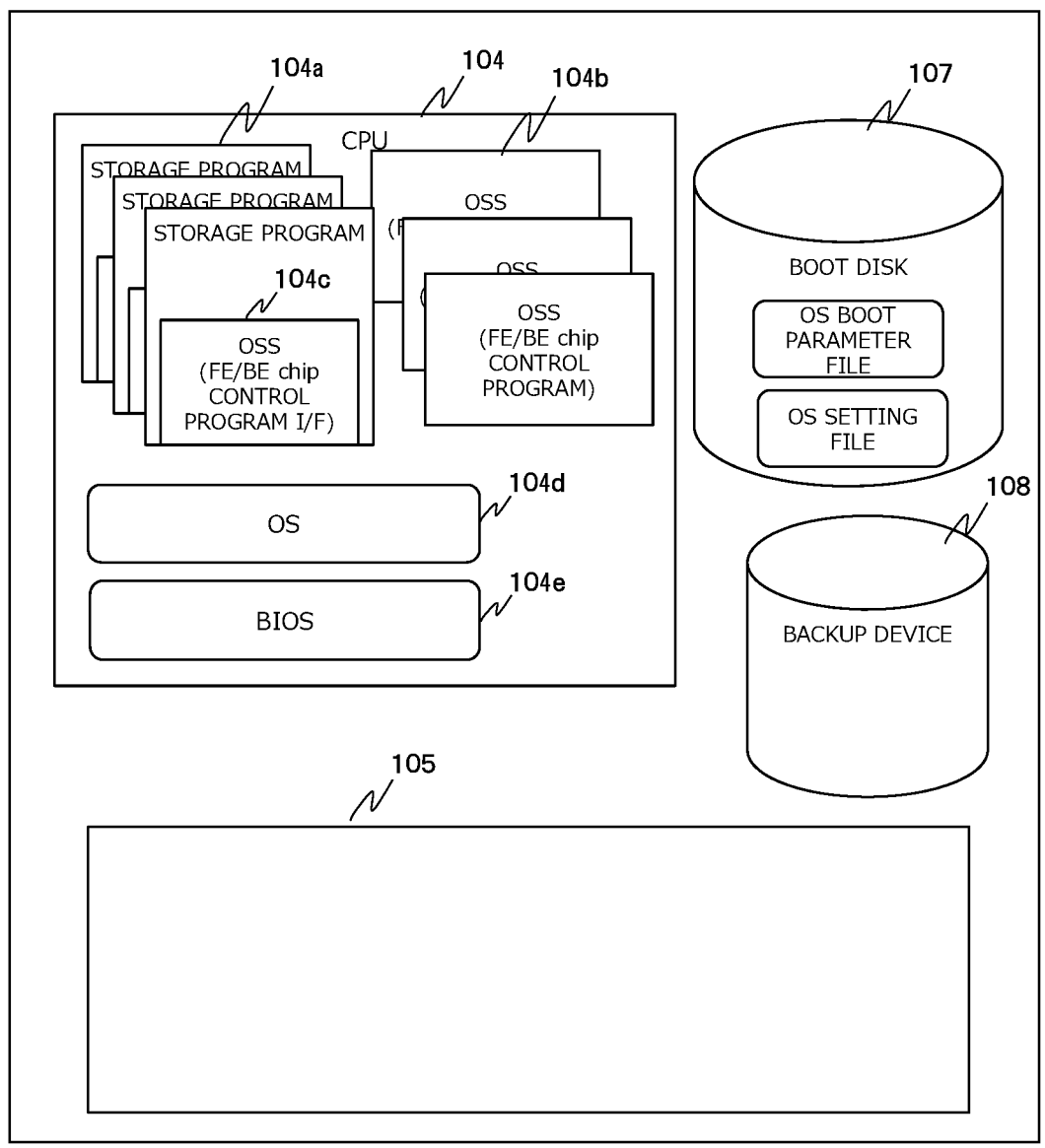
FIG. 2 is a block diagram illustrating an internal configuration of a computer 10.

FIG. 2 is a block diagram illustrating an internal configuration of the computer 10.

The CPU 104 executes a plurality of processes on a BIOS 104e and an OS 104d. Regarding the plurality of processes, plural pieces of OSS 104b and a plurality of storage programs 104a which are a plurality of applications operate. In the first embodiment, the OS 104d assumes Linux. The storage program forms a virtual storage device.

The storage program 104a is software for realizing "redundant array of inexpensive disks (RAID)" as a function of providing data redundancy or for realizing a function such as a snapshot function of acquiring the duplicate of data, which is provided as a storage system. The storage program 104a is executed by the CPU 104 to form a virtual storage device. The storage program (virtual storage device) 104a is managed as a process by the OS 104d. One type of the storage program 104a may operate as a storage management program to manage physical resources (also referred to as a physical area below) used by the storage program 104a.

An OS boot parameter file and an OS setting file are stored in the boot disk 107. A protection target management table T130 is stored in the backup device 108. The physical resource of the DRAM 105 will be described with reference to FIG. 3.

Figure 3:
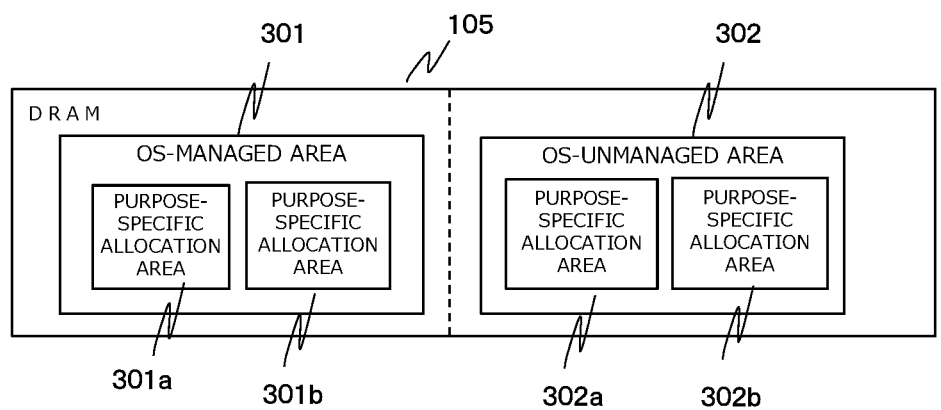
FIG. 3 is a diagram illustrating a configuration example of physical resources of a DRAM 105 according to the first embodiment.

FIG. 3 is a diagram illustrating a configuration example of physical resources of the DRAM 105 according to the first embodiment.

The physical resource of the DRAM in the computer 10 includes an OS-managed area 301 managed by the OS 104d and an OS-unmanaged area 302 which is mounted on the computer 10, but is not managed by the OS 104d.

The OS-managed area 301 is a physical area of the DRAM 105 being the memory managed by the OS 104d and is provided for the application such as the OSS 104b by the CPU 104. A virtual address is allocated to the physical area of the OS-managed area 301 by the OS 104d, and the physical area of the OS-managed area is provided for the application such as the OSS 104b. The OS-unmanaged area 302 is a physical area of the memory, which is mounted on the computer 10 but is not managed by the OS 104d, and is used by the storage program 104a. When the storage program 104a forms a virtual storage device, the OS-unmanaged area 302 is provided for the virtual storage device.

When the computer 10 activates the OS 104d, a user may set the memory amount of the OS-managed area being the amount of the physical memory used by the OS 104d, as a boot operation of the OS 104d. The memory amount of the OS-managed area may be equal to or smaller than the capacity of the DRAM 105. The OS-managed area 301 refers to an area from the leading of the physical address to the memory amount of the OS-managed area in the DRAM 105. The OS-unmanaged area 302 refers to an area from a physical address immediately after the area of the OS-managed area 301 to a physical address of a termination of the DRAM 105, in the DRAM 105.

Since the OS-managed area 301 is set as an area usable by the OS 104d, it is possible to allocate continuous areas in the OS-unmanaged area 302 to the virtual storage device without using the OS-managed area 302 in the OS 104d.

The memory amount of the OS-managed area set by the user may be obtained by obtaining the amount of a physical memory used as a virtual storage by the storage program 104a and subtracting the obtained amount from the total memory amount of the DRAM 105.

The OS-managed area 301 refers to a memory area managed by the OS 104d when the OS 104d or each application requests the OS 104d to secure the memory of the DRAM 105. In this area, it is not possible to secure the memory by designating a physical address of the DRAM 105 from the storage program 104a.

The OS-unmanaged area 302 is an area in which the OS 104d can see the physical memory space of the DRAM 105 but does not use the memory due to the memory securing logic of the OS. That is, the OS-unmanaged area 302 refers to a physical resource of the DRAM, which is not associated with the virtual address in the OS 104d. The OS-unmanaged area 302 is an area that may be assigned by explicitly designating a physical address from the storage program 104a using the I/F of the OS 104d.

The OS 104d constructs a process of a virtual storage device from the OS-managed area 301 using a container technology of integrally managing a plurality of processes. The container technology is a resource dividing function including a CPU allocation adjustment program and a memory allocation adjustment program. In the case of a technology having such a resource dividing function, the OS 104d may construct the process of the virtual storage device by using a technology other than the container technology. The CPU allocation adjustment program allocates the resources of the CPU 104 to the process executed on the OS. The computer 10 allocates the resource of the OS-managed area 301 of the physical memory to the process executed on the OS 104d.

For the OS-managed area 301, continuous areas (consecutive addresses) of the DRAM 105 are allocated as purpose-specific allocation areas 301a and 301b. The continuous areas (consecutive addresses) of the DRAM 105 are also allocated as purpose-specific allocation areas 302a and 302b for the OS-unmanaged area 302.

<Various Management Tables>

FIG. 4 is a diagram showing an example of the storage program memory mapping table (mapping table T40 below) stored in the boot disk 107. Contents of the table are set by the user.

In the mapping table T40, an area ID 401 for identifying the physical area of the DRAM 105, a purpose 402 for which the virtual storage device uses the DRAM 105, a shared range 403, a continuous required size 404, a virtual leading address 405 managed by the OS, an OS-managed area 406 indicating whether the area is the OS-managed area, and an allocation flag 407, which correspond to the area identified by the area ID, are stored.

As the purpose 402, for example, a local memory (LM) in which the area identified by the area ID is a management area occupied and used by each core 1041, a shared memory (SM) in which the area identified by the area ID is shared and used by all cores 1041 in the system, a cache memory (CM) in which the area identified by the area ID is a user data area shared and used by all the cores 1041 in the system, and a DXBF used as a buffer area for data transfer are provided.

Information regarding a storage process using the area identified by the area ID is stored in the shared range 403. For example, information indicating which virtual storage device uses the area is stored.

Information on a continuous size requested by the storage process is stored in the continuous required size 404.

A leading address of the virtual address provided for the storage program and the like by the OS 104*d* is stored in the virtual leading address 405.

Information on whether or not the area identified by the area ID is the OS-managed area 301 is stored in the OS-managed area 406. Here, in the case of "TRUE", the information indicates that the area is set in the OS-managed area 301.

If the area indicated by the area ID is set to be in the OS-managed area 301, the cooperation with the OSS and the enhancement as the virtual storage device by the storage program 104*a* are facilitated.

If the area indicated by the area ID is set to be in the OS-unmanaged area 302, it is possible to flexibly set the allocation size of the virtual address used by the virtual storage device and the storage program 104*a*. It is possible to easily secure the continuity of the physical address.

If the OS-managed area 301 or the OS-unmanaged area 302 is used in accordance with the purpose of the storage program 104*a*, it is possible to perform data transfer fast and to flexibly form a memory area required by the storage program.

Information indicating whether a physical resource of the DRAM 105 is allocated to the virtual address of the area identified by the area ID is stored in the allocation flag 407.

In FIG. 4, for example, the purpose 402 of "LM", the shared range 403 of "storage process 1", the continuous required size 404 of "0x1000", the virtual leading address 405 of "0x0000_0010_0000", the OS-managed area 406 of "TRUE", and the allocation flag 407 of "TRUE" are stored for the area 401 of "1". In the allocation flag 407, "FALSE" is stored in correspondence with all area IDs in system boot.

FIG. 5 is a diagram showing an example of an in-DRAM huge-page-number management table which is stored in the DRAM 105 or the storage device 110 by the OS 104*d* and is used for managing the physical area of the OS-managed area. The huge page may be selected from a predetermined allocation size, for example, three allocation size of 1 GB, 2 MB, and 4 k. A reservation number 502 and an allocated number 503 are managed for each of the three allocation size 501 in correspondence with each of the three allocation size 501. When the physical resource of the DRAM 105 is secured using a huge page function, the OS 104*d* manages the correspondence between the virtual leading address 405 of the mapping table T40 (FIG. 4) and the address of the secured physical resource. The huge page is a function of the OS 104*d* to secure continuous physical addresses (areas of a predetermined size) in the OS-managed area 301.

It is possible to secure physically-continuous areas in the OS-managed area 301 by the OS 104*d* using the huge page function and to provide the secured areas for the storage program (virtual storage device) 104*a*.

Since the memory areas which are secured using the huge page function and are physically continuous are in the OS-managed area 301, it is also possible for the application being the OSS 104*b* to use the memory areas. Therefore, it is possible to cause both the storage program 104*a* and the OSS 104*b* to refer to the memory areas by using the virtual address allocated by the OS 104*d*. In addition, when data transfer is performed between the application and the virtual storage device, it is possible to prevent an occurrence of useless data transfer in the memory.

The data transfer between the application and the virtual storage device is processed by DMA transfer of the DMA controller 1042.

In the first embodiment, as such data transfer, data transfer by the FE/BE chip and the ASIC may be included in addition to the DMA transfer. For example, data transfer between the FE chip included in the HBA 102 or the NIC 103 and the drive controller 109 including the BE chip by the ASIC 101 may be included. The FE chip or the BE chip operating on the OS 104*d* as illustrated in FIG. 2 is also used for data transfer with the storage program (virtual storage device) 104*a*. Data transfer between the FE chip and the BE chip or data transfer between the FE chip or the BE chip, and the storage program (virtual storage device) 104*a* may be controlled by the ASIC 101.

FIG. 6 is a diagram showing an example of a DRAM OS-unmanaged management table stored in the DRAM 105 or the storage device 110 by the storage program 104*a*.

In the DRAM OS-unmanaged management table T51, an in-management offset of "0xA_8000_0000" corresponding to the final physical address (information corresponding to the leading physical address of the OS-unmanaged area) of the OS-managed area 301, an non-management max address of "0xF_FFFF_FFFF", which is the final address of the DRAM usable as the OS-unmanaged area 302, and the final address of the physical memory to which the virtual address is allocated are managed as an allocation offset address of "0xA_F004_3FFF".

FIG. 7 is a diagram showing an example of an in-system memory amount management table.

The in-system memory amount management table T70 is stored in the DRAM 105 or the storage device 110. In the in-system memory amount management table T70, DRAM capacity in the entire system, a storage-process-unit control information material amount (LM), a storage-system-unit control information material amount (SM), a storage-system transfer buffer memory usage amount (DXBF), and a storage-cache-amount memory usage amount (CM) are managed respectively.

<Operation Description>

Figure 8:
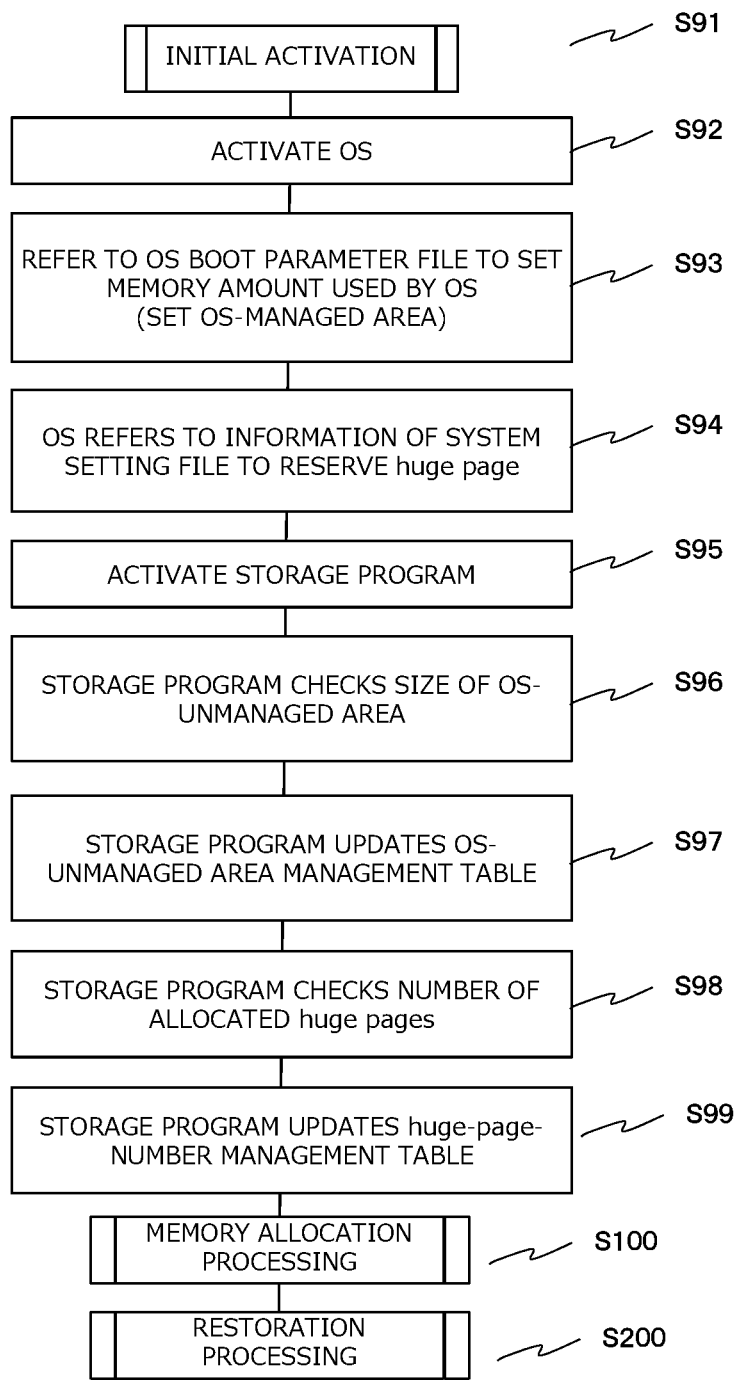
FIG. 8 is a flowchart illustrating an initial activation operation performed by the computer 10.

FIG. 8 is a flowchart illustrating an operation (including the initial activation operation) performed by the CPU 104 in the computer 10.

When an initial activation Step S91 is started, the OS 104*d* is activated in Step S92.

Then, in Step S93, the OS 104*d* refers to the OS boot parameter file (including the mapping table T40) in the boot disk 107 to set the memory amount (OS-managed area) of the DRAM, which is used by the OS. With this step, a physical resource allowed to be set in the OS-unmanaged area of Linux as the OS 104*d* is also determined.

Then, in Step S94, the OS 104*d* refers to the number of reserved huge pages of the system setting file (in-DRAM huge-page-number management table T50) to reserve the huge page.

Then, in Step S95, the storage program 104*a* is activated.

In Step S96, the storage program 104*a* checks the size of the OS-unmanaged area with reference to the size of the OS-managed area determined in Step S93.

In Step S97, the storage management program 104*a* updates the DRAM OS-unmanaged management table T51. Specifically, the storage management program 104*a* updates values of an in-management offset address, a non-management max address, and an allocation offset address, which indicate the OS-unmanaged area, based on the OS-managed area determined in Step S93.

In Step S98, the storage management program 104*a* checks the number of allocated huge pages. This is performed such that the storage management program 104*a* checks whether allocation of the huge pages reserved by the OS in Step S94 is possible.

In Step S99, the storage program 104a updates the huge-page-number management table. The operations from Steps S96 to S99 may be performed by the storage management program that operates by one type of the storage program 104a.

In Step S100, the memory allocation processing is executed. In Step S200, restoration processing is executed. The operations will be described later.

Figure 9:
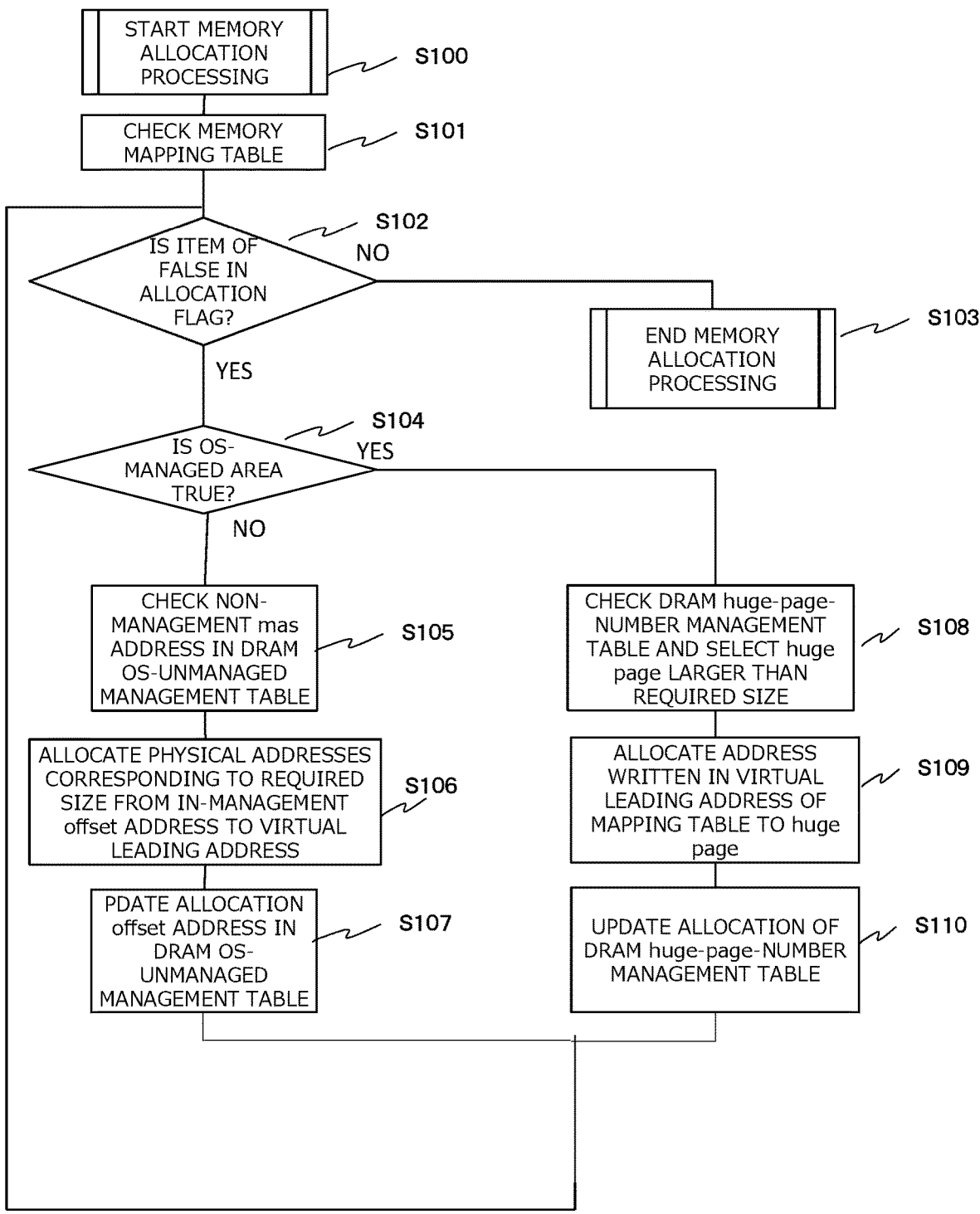
FIG. 9 is a flowchart describing a detailed operation of memory allocation processing.

FIG. 9 is a flowchart describing a detailed operation of the memory allocation processing (S100) by the storage management program 104a.

When the memory allocation processing is started (S100), the storage management program 104a refers to the mapping table 140 (S101).

In Step S102, it is determined whether the allocation flag 407 in the mapping table 140 is the item of FALSE. When the allocation flag 407 is "FALSE", the allocation flag indicates that the physical resource of the DRAM 105 is not allocated to the virtual address identified by the area ID. When the allocation flag 407 is not the item of FALSE, physical resources are allocated to all areas, and thus the processing is ended (S103).

When the allocation flag 407 is the item of FALSE in Step S102, the process proceeds to Step S104. Then, it is determined whether the OS-managed area 406 in the mapping table 140 is "TRUE".

In the case of YES in the determination of Step S104, the process proceeds to Step S108. In the case of NO, the process proceeds to Step S105.

In Step S105, the non-management max address in the DRAM OS-unmanaged management table T51 is checked.

In Step S106, physical addresses corresponding to the continuous required size 404 from the in-management offset address in the DRAM OS-unmanaged management table T51 are allocated to the virtual leading address 405. That is, the physical addresses corresponding to the required size from the allocated physical addresses in the OS-unmanaged management table are allocated from the virtual leading address in the mapping table. Thus, the physical address of the DRAM is allocated to the virtual address of the OS. In this step, for example, the physical resource of the DRAM is allocated to the virtual storage device by using the OS-unmanaged area 302.

In Step S107, the allocation offset address in the DRAM OS-unmanaged management table T51 is updated. The updated allocation offset address functions as the leading address of the next area. That is, the allocated physical address in the OS-unmanaged management table is updated. At this time, the allocation flag in the mapping table 140 is updated to "TRUE".

When the process proceeds from Step S104 to Step S108, in Step S108, the in-DRAM huge-page-number management table T50 is checked, and the huge page larger than the continuous required size is selected. For example, when the continuous required size is 1 MB, the huge page of 2 MB is selected.

In Step S109, an address written in the virtual leading address 405 of the mapping table 140 is allocated to the huge page. Thus, the virtual address of the OS is allocated to the physical address of the DRAM.

In Step S110, the number of allocated huge pages in the in-DRAM huge-page-number management table T50 is updated. At this time, the allocation flag in the mapping table 140 is updated to "TRUE".

When the processes of Steps S107 and S110 are ended, the process returns to Step S102. Then, it is determined whether the item of "FALSE" is in the allocation flag. When "FALSE" is in the allocation flag, the similar processes are repeated. When "FALSE" is not in the allocation flag, the processing is ended.

According to the first embodiment, in accordance with the purpose of the storage program, Linux as the OS 104d secures physically-continuous memory areas gathered in the OS-managed area 301 in the memory by the huge page, and thus the storage program 104a can freely control the memory areas.

The OSS such as the FE/BE chip control program 104b or the FE/BE chip control program I/F 104c refers to the mapping table 140 used in the storage program to perform an access with the virtual address. Thus, it is possible to also perform an access to the memory area secured by the huge page, from the OSS configured to operate on Linux.

As described above, according to the first embodiment, for each purpose of the DRAM, it is possible to set the continuous physical areas to be the OS-unmanaged area in the physical resource and the area of the OS-managed area. Thus, when data transfer is performed between the application of the OSS operating on the OS (Linux) and the virtual storage device, it is possible to suppress the occurrence of unnecessary data transfer between the OS (Linux)-unmanaged area in the physical resource and the area of the OS (Linux)-managed area and to improve the performance.

Second Embodiment

In the first embodiment, the occurrence of unnecessary data transfer between the OS-unmanaged area in the physical resource and the area of the OS-managed area is suppressed. Thus, Linux as the OS 104d secures physically-continuous memory areas gathered in the OS-managed area 301 in the memory by the huge page. Since the huge page is secured in accordance with the purpose such as the LM, the CM, the SM, and the DXBF of the storage program, the physical address of the DRAM that stores data to be saved in power cut-off becomes discrete.

In power cut-off, the BIOS which is not capable of referring to the virtual address provided by the OS designates the physical address of the DRAM and saves the data. Therefore, a new management method of the physical address of the DRAM that stores data to be saved in power cut-off, in the physical area secured by the huge page, is required.

In a second embodiment, a technology of managing the physical address for saving data in power cut-off will be described.

FIG. 10 shows a storage program memory mapping table T100 obtained by adding a data item used in power cut-off to the storage program memory mapping table (mapping table 140 below) (FIG. 4) in the first embodiment.

A power-off target flag 1001 indicating that data is to be saved in power cut-off is added in accordance with the purpose 402. In the case of "FALSE", the power-off target flag 1001 indicates that saving of data in power cut-off is not required. In the case of "TRUE", the power-off target flag 1001 indicates that saving of data in power cut-off is required.

The power-off target flag 1001 is set in accordance with the purpose 402, the size of the area, and the like. A memory area that stores data not to be lost in power cut-off is set as a target.

In FIG. 10, a placement destination memory type 1002 indicating the type of memory, that is, whether the memory is the DRAM or the storage class memory (SCM) as the type of memory is added. The DRAM is a volatile memory, but the SCM is a non-volatile memory. When data for each purpose is stored in the SCM, there is no need to save data in power cut-off. Therefore, when the placement destination memory type 1002 is "SCM", the power-off target flag 1001 is "FALSE". The placement destination memory type 1002 becomes unnecessary when the SCM is not used.

FIG. 11 is a diagram showing an example of an in-SCM huge-page-number management table T110 stored in the SCM 106 or the storage device 110 by the OS 104d.

FIG. 12 is a diagram showing an example of an SCM OS-unmanaged management table T120 stored in the SCM 106 or the storage device 110 by the storage program 104a.

FIG. 5 shows the in-DRAM huge-page-number management table T50, but FIG. 11 shows the SCM huge-page-number management table T110. The devices that perform the management are different from each other, but the contents are common.

FIG. 6 shows the DRAM OS-unmanaged management table T51, but FIG. 12 shows the SCM OS-unmanaged management table T120. The devices that perform the management are different from each other, but the contents are common.

FIG. 13 shows an example of a protection target management table T130 used as the reference by the BIOS in power cut-off.

In the protection target management table T130, an area ID 1101, a leading physical address 1102, a size 1103, a restoration management flag 1104 are managed.

The area ID 1101 corresponds to the area ID 401 in the storage program memory mapping table T100 and is information for identifying a physical area of the DRAM or the SCM.

The leading physical address 1102 is a value of a physical address corresponding to the area identified by the area ID. In the case of the DRAM, the value of the allocation offset address in the DRAM OS-unmanaged management table T51 is input. In the case of the SCM, the value of the allocation offset address in the SCM OS-unmanaged management table T120 is input.

The size 1103 is the size of the memory area identified by the area ID 1101.

The restoration management flag 1104 indicates the state of data recovery. Data recovery means that data in the memory (DRAM or SCM) is recovered by the saved data. In the case of "FALSE", this indicates that data recovery has not been completed. In the case of "TRUE", this indicates that data recovery has been completed. Although not shown in FIG. 13, an item for managing the address of the backup device 108 may be provided in each entry.

FIG. 14 shows a table corresponding to the in-system memory amount management table T70 in FIG. 7. Entire-system DRAM capacity and entire-system SCM capacity are added.

Figure 15:
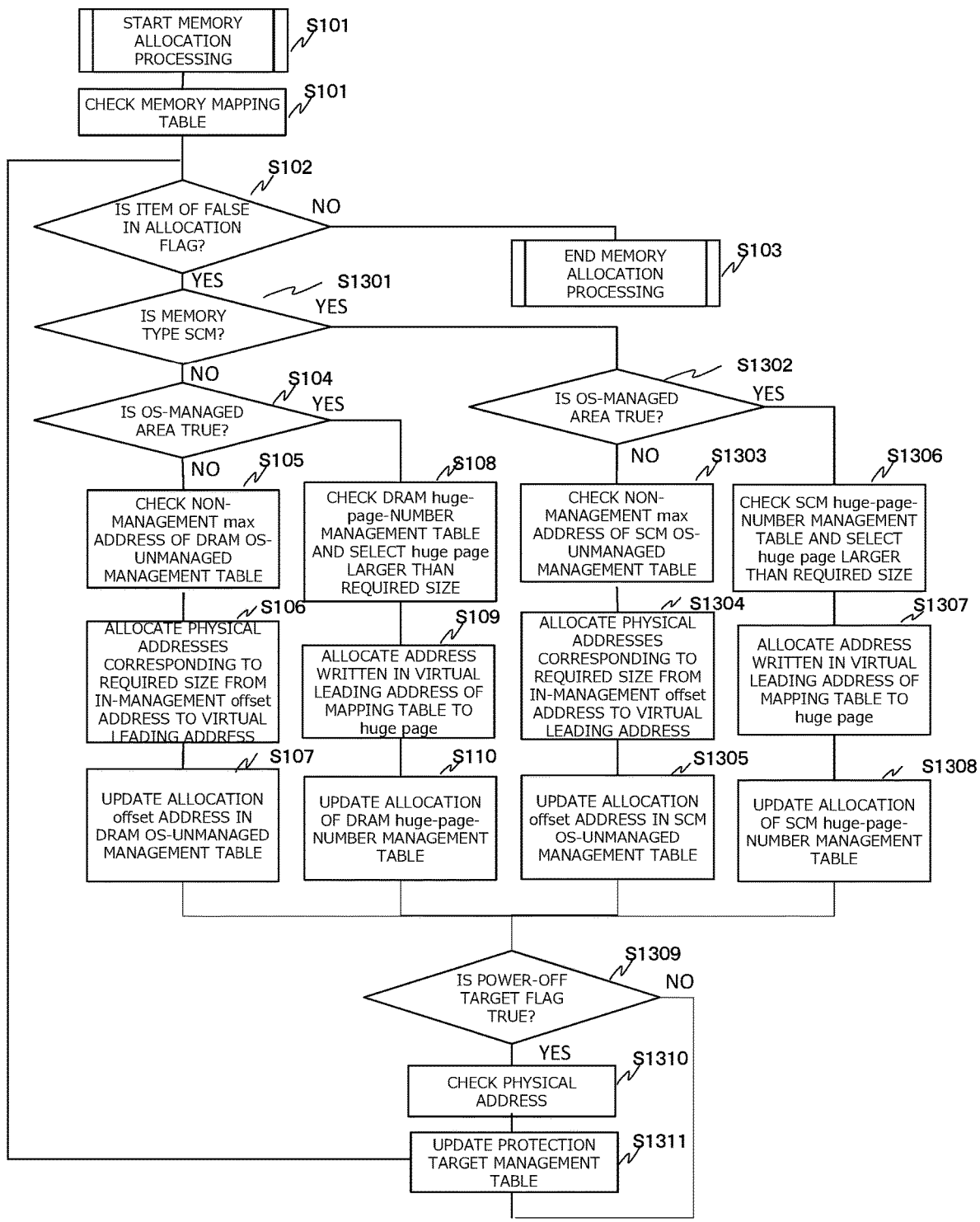
FIG. 15 is a flowchart describing a detailed operation of the memory allocation processing and creation of a protection target management table by a storage management program.

FIG. 15 is a flowchart describing a detailed operation of the memory allocation processing and creation of a protection target management table by the storage management program 104a.

Regarding the memory allocation processing in FIG. 15, the memory allocation processing for the DRAM is similar to the processes from Steps S100 to S110 illustrated in FIG. 9 in the first embodiment. Thus, description thereof will not be repeated, and only a difference will be described.

In Step S102, it is determined whether an item of FALSE is in the allocation flag 407. Then, in Step S1301, the memory type is determined with reference to the mapping table T100. When the memory is the DRAM, the process proceeds to Step S104. When the memory is the SCM, the process proceeds to Step S1302.

The processes from Steps S1302 to S1308 being the processes on the SCM are an operation corresponding to the processes from Steps S104 to S110 being the processes on the DRAM.

When the memory allocation processing is performed on the DRAM or the SCM, and the in-DRAM huge-page-number management table T50, the DRAM OS-unmanaged management table T51, the in-SCM huge-page-number management table T110, and the SCM OS-unmanaged management table T120 are updated, the process proceeds to Step S1309.

In Step S1309, the power-off target flag 1001 in the mapping table T100 is determined. When the power-off target flag 1001 is "TRUE", the process proceeds to Step S1310. When the power-off target flag 1001 is "FALSE", the process returns to Step S102, and the processing for another area ID is repeated.

In Step S1310, the physical address is checked. In Step S1311, the checked address is stored in the protection target management table T130.

When, with the mapping table T100, the target area of the processing is set as the OS-unmanaged area 302 by the OS-managed area 406, and the placement destination memory type 1002 is the DRAM, the value of the allocation offset address in the DRAM OS-unmanaged management table T51 (FIG. 6) is checked. Then, the value is stored in the leading physical address 1102 corresponding to the area ID of a processing target in the protection target management table T130 (FIG. 13). When, with the mapping table T100, the target area of the processing is set as the OS-unmanaged area 302 by the OS-managed area 406, and the placement destination memory type 1002 is the SCM, the value of the allocation offset address in the SCM OS-unmanaged management table T120 (FIG. 12) is checked. Then, the value is stored in the leading physical address 1102 corresponding to the area ID of a processing target in the protection target management table T130 (FIG. 13).

When, with the mapping table T100, the target area of the processing is set as the OS-managed area 301 by the OS-managed area 406, the OS 104d is inquired (checks) of the leading physical address of the DRAM or SCM memory secured for the area by the huge page. Then, the value is stored in the leading physical address 1102 corresponding to the area ID of a processing target in the protection target management table T130 (FIG. 13).

That is, when the area is determined to store the data to be saved in power cut-off, by the power-off target flag, the CPU 104 creates and updates the protection target management table managed by setting the allocated physical address of the OS-unmanaged management table or the leading physical address of the physical area secured by the selected huge page as the leading physical address of the area and associating the leading physical address with the physical address in the backup device 108 and the size of the area.

Thus, it is possible to manage the physical address of the DRAM or the SCM that stores data to be saved, for the leading physical address 1102 in the protection target management table T130.

Since the physical address of the DRAM or the SCM that stores data to be saved in power cut-off in the memory area secured in the OS-managed area 301 by the huge page of Linux as the OS 104d or in the memory area secured in the OS-unmanaged area 302 by the storage program is stored in the leading physical address 1102 in the protection target management table T130, it is possible to save data in an address in the backup device by the BIOS that performs an access by the physical address of the DRAM or the SCM, not the virtual address of the storage program.

Regarding the SCM, on the premise that there is no need to save data in power cut-off, when the placement destination memory type 1002 in FIG. 10 is the SCM, the power-off target flag 1001 in FIG. 10 may be set to "False".

Figure 16:
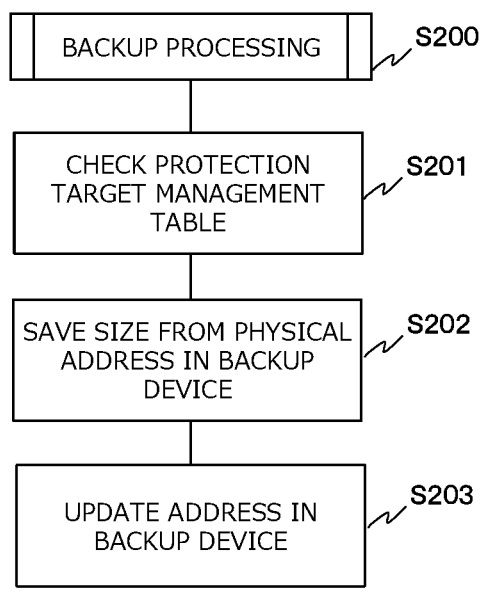
FIG. 16 is a flowchart describing a data backup processing operation in power cut-off.

FIG. 16 is a flowchart describing a data backup processing operation in power cut-off, which is performed by the storage program 104*a*.

When power is cut off due to power failure or the like, backup processing is started (S200).

When the backup processing is started (S200), in Step S201, the protection target management table T130 is checked, and the leading physical address 1102 and the size 1103 are grasped.

Then, in Step S202, the size 1103 from the leading physical address 1102 is saved in the backup device.

In Step S203, the address in the backup device is updated, and the restoration management flag 1104 is set to "FALSE".

Figure 17:
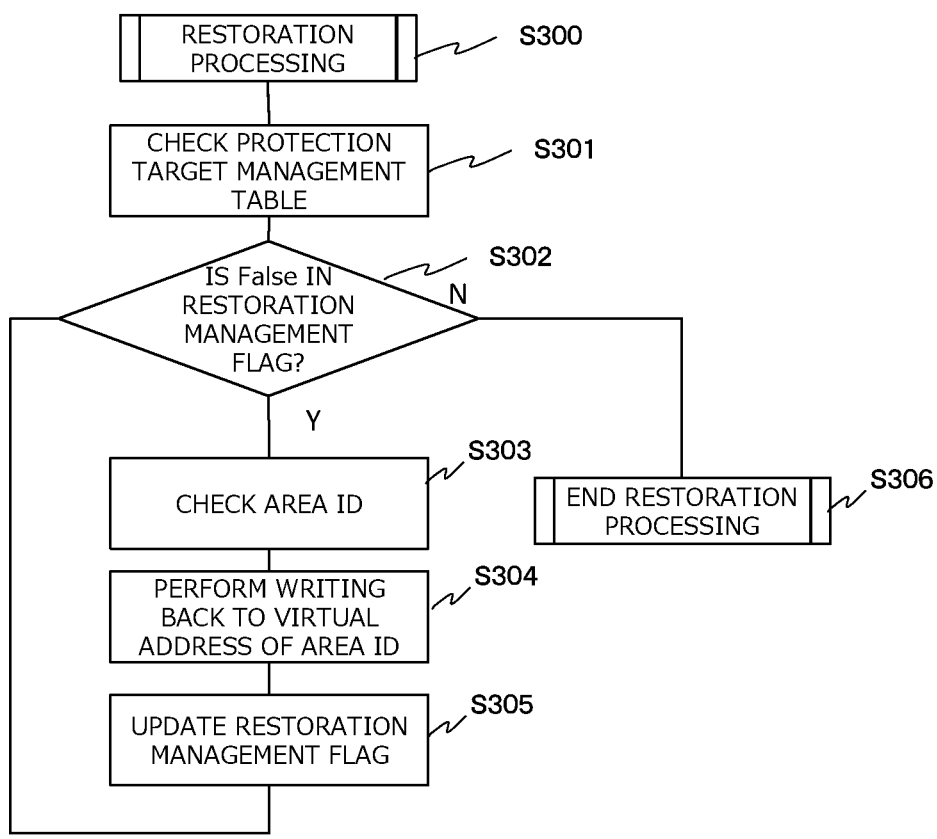
FIG. 17 is a flowchart describing a restoration processing operation.

FIG. 17 corresponds to restoration processing of Step S200 in FIG. 9 and is a flowchart describing a restoration processing operation of the CPU 104 that executes the storage program 104*a*. The restoration processing is performed using data saved in the backup device.

When the restoration processing is started (S300), in Step S301, the restoration management flag 1104 is checked for each area ID 1101 in the protection target management table T130.

In Step S302, it is determined whether "FALSE" is in the restoration management flag. When there is an area in which "FALSE" is set, the processing is ended (S306).

In Step S303, when "FALSE" is set, the area ID 1101 is checked. In Step S304, writing back to the virtual address corresponding to the checked area ID is performed. That is, the data saved in the backup device is restored in correspondence with the virtual leading address of the corresponding area of the mapping table. Thus, it is possible that the storage program 104*a* accesses the physical address of the device that stores the saved data, by using the virtual address.

Finally, in Step S305, the restoration management flag 1104 in the protection target management table T130 is updated to "TRUE".

With the address management when data is saved in the second embodiment, even when the physical address of the DRAM or the SCM corresponding to the virtual address used by the storage program is secured discretely, it is possible to save data to be saved in power cut-off.

It is possible to access data saved with the virtual address of the storage program by the restoration processing in the second embodiment.

As described above, according to the second embodiment, when data transfer is performed between the virtual storage device and the OSS application that operates on Linux, it is possible to suppress the occurrence of unnecessary data transfer between the area in the Linux-unmanaged physical resource and the area of the Linux-managed area and to improve the performance.

Even though the memory area secured for the virtual storage device by the OS is secured discretely, it is possible to save data to be saved in power cut-off.

In addition, the virtual storage device can access data saved with the virtual address of the storage program by the restoration processing.

What is claimed is:

1. A computer comprising:
a memory; and
a processor connected to the memory,
wherein the processor is configured to:
execute an operating system (OS), and a plurality of processes on the OS, the plurality of processes include a virtual storage device and an application,
allocate a portion of the memory, which is managed by the OS as an OS-managed area,
manage another portion of the memory, which is mounted on the computer, but is not managed by the OS, as an OS-unmanaged area,
allocate a first physical area of the OS-managed area of the memory to the application,
allocate a second physical area, which is different than the first physical area, of the OS-unmanaged area of the memory to the virtual storage device,
allocate a third physical area of the OS-managed area, which is different than the first physical area and the second physical area and is a continuous physical area, to a first process which is used by both the virtual storage device and the application, and
perform direct memory access (DMA) transfer between the virtual storage device and the application by using the continuous third physical area in the OS-managed area,
wherein the computer further comprises:
a boot disk,
wherein the boot disk stores a mapping table for managing a virtual leading address of the OS and information indicating whether or not an area is the OS-managed area, for each area of the memory,
wherein the continuous physical areas are secured from the OS-managed area by the processor using a function of a huge page,
wherein the memory stores:
a huge-page-number management table for managing the reserved number of huge pages and the allocated number of huge pages for the size of the huge page in order to manage a respective physical area of the OS-managed area, and
an OS-unmanaged management table for managing information corresponding to a leading physical address of the OS-unmanaged area of the memory and a respective physical address allocated to the virtual storage device,
wherein the processor is configured to:
refer to the mapping table to determine whether a target area is the OS-managed area,
when the target area is not the OS-managed area, allocate physical addresses corresponding to a required size from the allocated physical address of the OS-unmanaged management table, from the virtual leading address of the mapping table and updates the allocated physical address of the OS-unmanaged management table, and
when the target area is the OS-managed area, refer to the huge-page-number management table to select a huge page having a size larger than the required size, allocate a physical area secured by the selected huge page from the virtual leading address of the mapping table, and update the allocated number in the huge-page-number management table,
wherein the mapping table manages a power-off target flag indicating whether the area of the memory stores data to be saved in power cut-off, for each area of the memory, and
when the area stores the data to be saved in power cut-off, by the power-off target flag, the processor is configured to create a protection target management table managed by setting the allocated physical address of the OS-unmanaged management table or the leading physical address of the physical area secured by the selected huge page as the leading physical address of the area and associating the leading physical address with a physical address in a backup device and the size of the area.

2. The computer according to claim 1,
wherein the memory includes a volatile memory and a non-volatile memory, and
wherein the mapping table further manages, for each area of the memory, information indicating whether the memory in which the area is disposed is the volatile memory or the non-volatile memory, and the power-off target flag indicating whether the area stores data to be saved in power cut-off.

3. The computer according to claim 1,
wherein the computer includes the backup device, and
wherein the physical address in the backup device in the protection target management table manages a storing destination address of saved data in the backup device.

4. The computer according to claim 3, wherein
the processor restores the saved data in the backup device in association with a virtual leading address of the corresponding area in the mapping table.

5. A memory management method of a computer comprising a memory and a processor connected to the memory, the method executed by the processor, the method comprising:
  executing an operating system (OS) and a plurality of processes on the OS, the plurality of processes including a virtual storage device and an application;
  allocating a portion of the memory, which is managed by the OS as an OS-managed area;
  managing another portion of the memory, which is mounted on the computer, but is not managed by the OS, as an OS-unmanaged area;
  allocating a first physical area of the OS-managed area of the memory to the application;
  allocating a second physical area, which is different than the first physical area, of the OS-unmanaged area of the memory to the virtual storage device;
  allocating a third physical area of the OS-managed area, which is different than the first physical area and the second physical area and is a continuous physical area, to a first process which is used by both the virtual storage device and the application; and
  performing direct memory access (DMA) transfer between the virtual storage device and the application by using the continuous third physical area in the OS-managed area,
wherein the computer further comprises:
  a boot disk,
wherein the method further comprises:
  storing, by the boot disk, a mapping table for managing a virtual leading address of the OS and information indicating whether or not an area is the OS-managed area, for each area of the memory;
wherein the continuous physical areas are secured from the OS-managed area by the processor using a function of a huge page,
wherein the memory stores:
  a huge-page-number management table for managing the reserved number of huge pages and the allocated number of huge pages for the size of the huge page in order to manage a respective physical area of the OS-managed area, and
  an OS-unmanaged management table for managing information corresponding to a leading physical address of the OS-unmanaged area of the memory and a respective physical address allocated to the virtual storage device,
wherein the processor is configured to:
  refer to the mapping table to determine whether a target area is the OS-managed area,
  when the target area is not the OS-managed area, allocate physical addresses corresponding to a required size from the allocated physical address of the OS-unmanaged management table, from the virtual leading address of the mapping table and updates the allocated physical address of the OS-unmanaged management table, and
  when the target area is the OS-managed area, refer to the huge-page-number management table to select a huge page having a size larger than the required size, allocate a physical area secured by the selected huge page from the virtual leading address of the mapping table, and update the allocated number in the huge-page-number management table,
wherein the mapping table manages a power-off target flag indicating whether the area of the memory stores data to be saved in power cut-off, for each area of the memory, and
when the area stores the data to be saved in power cut-off, by the power-off target flag, the processor is configured to create a protection target management table managed by setting the allocated physical address of the OS-unmanaged management table or the leading physical address of the physical area secured by the selected huge page as the leading physical address of the area and associating the leading physical address with a physical address in a backup device and the size of the area.

* * * * *